United States Patent [19]

Rak

[11] Patent Number: 5,220,843
[45] Date of Patent: Jun. 22, 1993

[54] IN SITU METHOD OF DETERMINING THE THRUST ON VALVE COMPONENTS

[75] Inventor: Thomas A. Rak, St. Helens, Oreg.

[73] Assignee: Portland General Electric Corporation, Portland, Oreg.

[21] Appl. No.: 736,707

[22] Filed: Jul. 26, 1991

[51] Int. Cl.[5] .......................... G01L 5/22; G01L 25/00
[52] U.S. Cl. .................................. 73/862.29; 73/1 B; 73/168; 73/862.49; 251/129.04
[58] Field of Search .......... 73/168, 1 B, 1 C, 862.195, 73/862.29, 862.31, 862.338, 862.49, 862.627; 251/129.04, 129.11, 129.12, 129.13; 137/551, 554

[56] References Cited

U.S. PATENT DOCUMENTS

| | | | |
|---|---|---|---|
| 2,216,563 | 10/1940 | Cartier | 73/862.29 |
| 2,598,062 | 5/1952 | Krecan | 137/724 |
| 3,657,926 | 4/1972 | Munson et al. | 73/1 C X |
| 4,177,825 | 12/1979 | Crawford | 251/77 X |
| 4,349,885 | 9/1982 | Thompson | 364/558 |
| 4,570,903 | 2/1986 | Crass | 251/129.12 |
| 4,633,702 | 1/1987 | Kaiser et al. | 73/9 |
| 4,977,782 | 12/1990 | Stöhr et al. | 73/862.29 |

OTHER PUBLICATIONS

Pages 2-5 of an Inspection Report published with a letter dated May 24, 1991 to Mr. Richard H. Tuft, President, Liberty Technologies, Conshohocken, Pa.

Pages 2-8 of an Inspection Report published with a letter dated May 24, 1991 to Mr. Don L. Janececk, President, ITI MOVATS, Kennesaw, Ga.

*Primary Examiner*—Tom Noland
*Attorney, Agent, or Firm*—Klarquist, Sparkman, Campbell, Leigh and Whinston

[57] ABSTRACT

Without disassembling a valve stem from a valve, the valve is decoupled from a valve actuator such that the valve stem and attached valve disc or body may shift to and from a seated position without interference by the actuator. Known loads are applied to the decoupled valve stem to cause a strain gauge output which corresponds to the known load. The strain gauge is mounted to the valve stem or other force reactive components of the valve which react by changing in dimension in response to the applied known load. The relationship of the applied load to the strain gauge output is determined to thereby calibrate the valve stem. The load is removed and the valve stem is recoupled to the valve actuator for operation. From the strain gauge output during either or both static and dynamic operation of the valve, the thrust on the valve stem is directly obtained and is used to evaluate the performance of the valve and actuator.

12 Claims, 4 Drawing Sheets

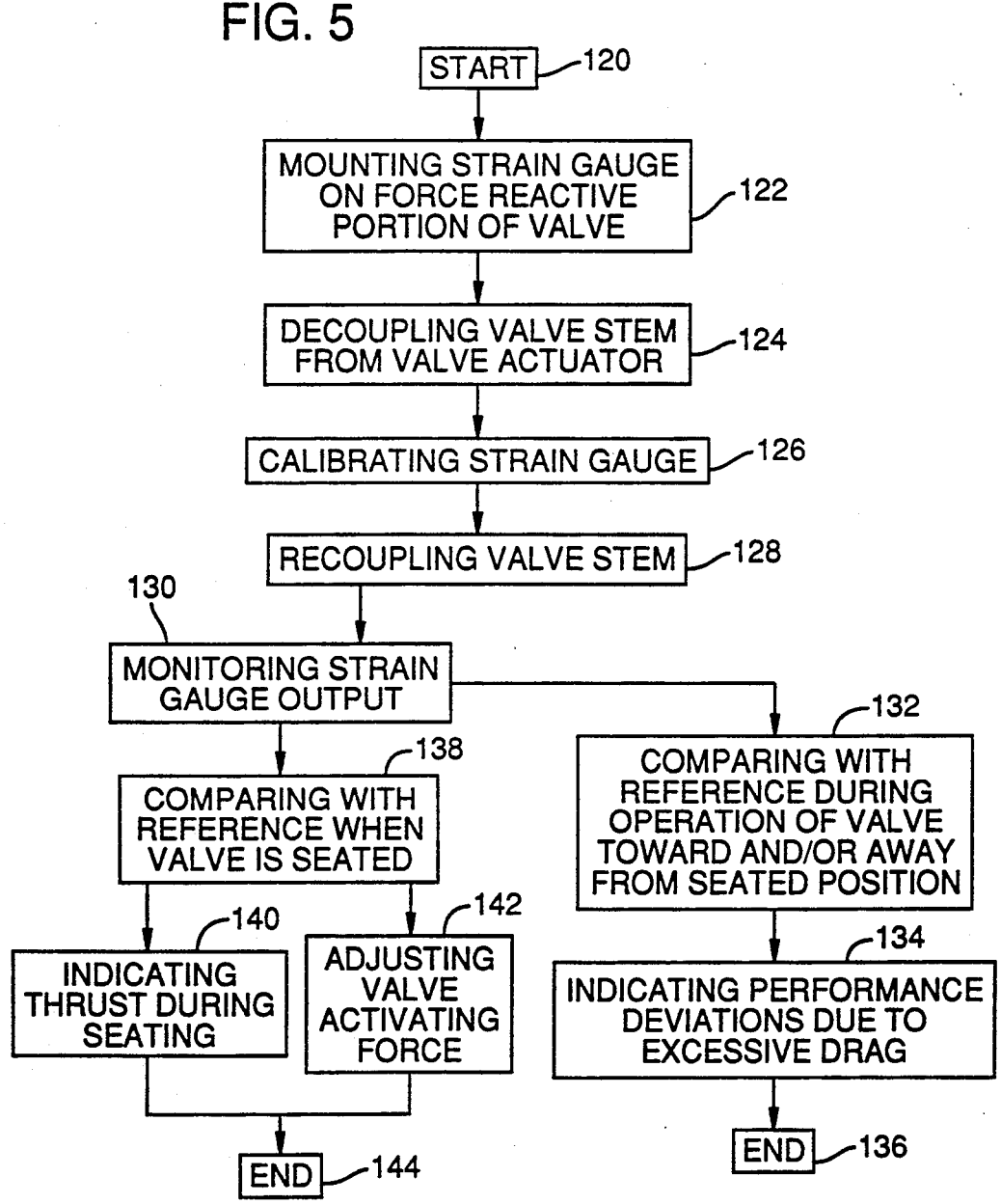

IN SITU METHOD OF DETERMINING THE THRUST ON VALVE COMPONENTS

BACKGROUND OF THE INVENTION

The present invention is directed to an in situ method of determining the thrust on a valve stem during operation of the valve, without requiring removal of the valve stem to implement the method. This method has particular applicability to determining the thrust applied to a valve stem during seating of a valve disc or body in a valve seat and also during movement of the valve body toward and away from the valve seat.

In any valve, in order to stop the flow of fluid through such valve, the valve disc or body must be properly seated against the valve seat with the appropriate valve stem thrust. This proper seating is all the more critical in high pressure applications.

There are numerous situations in which it is essential that a valve be fully and properly, remotely and quickly closed upon command.

In these applications motorized valve actuators are often employed which, in response to commands from a control center, supply a motive force to the valve stem to close and seat the valve. A motive force which increases in magnitude is supplied to the valve stem until the valve stem supplies a predetermined amount of thrust to the valve disc and the valve seat.

The amount of valve stem thrust required to properly seat a valve is a function of the operating conditions of the valve. For example, in a high pressure valve, a large amount of valve stem thrust is necessary to counteract the high pressure of the fluid flowing through the valve. On the other hand, in a low-pressure application, there would be substantially less pressure present to counteract the thrust applied by the valve stem. In any case, as a function of the operating conditions, the manufacturer of a valve often specifies a minimum amount of valve stem thrust which is required to be applied by the valve stem in order to properly seat a valve in the valve seat.

In common motorized actuators, a torque limiter is often employed to shut down the motive source whenever a predetermined operating condition is reached in the actuator. Ideally this predetermined condition has a direct correlation with the amount of thrust at the valve stem. Unfortunately, the monitored condition is often only an indirect indication of the actual valve stem thrust present at the valve stem. The result is that once a valve, actuator and torque limiter are assembled and operational in a system, there is no direct method of verifying that the exact amount of thrust required to close the valve is in fact being supplied when the actuator shuts off.

It has been found that the above method, due to various effects, including aging and routine valve maintenance, can be highly ineffective, often resulting in stem thrusts at actuator shut off which are well below the required minimum thrust or well in excess of the maximum thrust that the valve is capable of withstanding. Excess thrust can cause the valve stem to bend, the valve seats to be damaged, the valve disc or body to be distorted, and even render the valve inoperable, often to the point where the valve is stuck closed and manually inoperable.

A malfunctioning valve at the very minimum can cause increased operating and servicing expenses, and in the worst possible scenarios create life-threatening conditions. One example of the former would be in a manufacturing plant where a water supply valve does not fully close because insufficient thrust is supplied by the valve actuator to the valve stem, thus leading to leakage and waste. An example of the latter situation would be in a steam driven power plant where an emergency situation requires the shut down of a high pressure steam line, the failure to do so resulting in pipe rupture or the like.

It is therefore easy to see why there is great interest in developing a method and apparatus by which the proper operation of a valve can be simply and inexpensively determined.

The typical valve for which the present invention is especially suited includes a valve stem which applies thrust to a valve disc or body to seat the disc into a valve seat. The valve stem is threaded, to accept a valve stem nut, or drive sleeve, which rotates about the valve stem. The valve stem, valve disc and valve seat are housed in a valve housing, with one end of the valve stem extending externally from the housing. The drive sleeve is disposed about the external portion of the valve stem and supported at a fixed distance from the valve housing by a valve actuator. As the drive sleeve is rotated, the valve stem is caused to move upward or downward, depending upon the direction of rotation of the drive sleeve.

The valve actuator may include a motive source which is coupled to the drive sleeve through a transmission assembly. This transmission assembly often takes the form of a worm and worm gear. The worm gear is mounted for rotation with the drive sleeve. The worm is positioned with axis of rotation perpendicular to the axis of rotation of the worm gear. As the motive source rotates the worm, the rotation of the worm is transferred to the worm gear for rotation of the worm gear in a plane perpendicular to the plane of rotation of the worm. The rotation of the worm gear is then transferred to the drive sleeve which, in turn, rotates to raise or lower the position of the valve stem.

As the valve disc comes into contact with the valve seat, the valve stem presents an increasing amount of resistance to the rotation of the drive sleeve. This resistance is transmitted to the worm via the worm gear, and results in movement of the worm in a direction away from the motive source.

In order to further rotate the worm, the worm gear and the drive sleeve, the motive source must supply additional force to the transmission assembly.

When a motor is employed as the motive source, it is typically regulated by a torque limiter mechanism which, as discussed above, senses the operating condition of the actuator and disconnects power to the motor whenever a predetermined condition is attained. Typically, the position of the worm and spring pack assembly is the condition which is sensed. After the worm and spring pack assembly has moved a predetermined distance, as a result of the increased resistance presented by the valve stem, power to the motor is automatically disconnected.

The movement of the worm is biased by a spring, typically a Belleville spring, the amount of compression of which is proportional to the thrust being supplied to the valve stem. The compression of the Belleville spring is tracked by a mechanism such as a gear which in turn actuates a switch. The switch is settable so that its contacts are disengaged when it is displaced over a selected distance. The curve obtained by plotting supplied thrust versus switch position of a properly operating unit is then used to set the switches of other similar units. In theory, once a calibration curve is obtained for a properly functioning unit, other similar units can be set by simply adjusting the torque switch control to a position determined from the calibration curve. It would, therefore, follow that a torque limiter could be set out in the field by simply setting the correct position on the torque switch.

As a verification of the proper functioning of the torque limiter switch, a reading may be taken of the operating current of the motor at the point where the motor is deactivated by the torque switch. So long as such operating current falls within the range of 1.5 to 3.0 times the running current, the valve is assumed to be operating correctly. The running current of the motor is defined as the current supplied to the motor when the motor is operating under normal load for the particular valve, i.e., not in the mode where the valve stem is beginning to provide turning resistance to the worm gear.

Once a valve has been installed within a system, the predominant method of verifying that the valve is operating correctly is to set the torque switch position as specified by the manufacturer and to monitor the operating current of the valve in the above manner. In practice, this method has been found to be, at times, highly inaccurate and often leads to valve damage, as well as to improperly operating valves. This is true because the indirect measurement method used in this approach is often not responsive to such occurrences as the aging of components of the valve, such as the Belleville springs, reconfiguration of the actuator to a high speed or a low speed mode, servicing of the valve itself, such as repacking of the valve seal, and various other effects.

U.S. Pat. No. 4,570,903 to Crass details the above and other problems associated with such an approach for setting torque switches. In an attempt to overcome these problems, Crass discloses the coupling of a force measuring device, such as a load cell, to the externally accessible end of a valve stem. An actuating force is then applied to the valve stem by a valve actuator. The valve stem actuation is terminated when a predetermined state of the actuating means is reached, with the output of the load cell being observed at the point where operation of the actuating means was terminated. This information is used in adjusting the setting of torque limiter switch controls so as to terminate the operation of the actuator when the desired amount of thrust is supplied to the valve stem.

Although this approach does not require the disassembly of the valve stem, it suffers from a number of drawbacks. For example, the method of the Crass patent provides an indication of the thrust on a valve stem under static conditions, for example when the valve disc or body is seated in a valve seat. However, this would not provide an accurate measurement of thrust under dynamic operating conditions when the valve stem is being moved toward and away from the closed position in which the valve body is seated. The Crass method purports to determine the net force composed of all of the forces applied to the valve stem, including the thrust supplied by the motive supply and transmission as well as sliding resistance provided by valve packing. However the dynamic resistance from valve packing, bent valve stems, and the like is not understood to be determined by the Crass approach. Therefore, information concerning these dynamic performance affecting characteristics of an operating valve are not available from the Crass approach.

Secondly, in the approach described in the Crass patent, the valve stem is drilled and tapped to receive coupling elements to which the load cell is connected to mount the load cell in position on the valve stem. Drilling and tapping of the valve stem weakens the stem. In addition, for valves that are already in place and which lack the tapped opening for receiving these coupling elements, as a practical matter one would have to remove the valve stem in order to drill and tap the stem to receive the load cell coupling components. In this case, the time-consuming and expensive disassembly of the valve would be required to permit these modifications of the valve stem. Also, assume the valve is being operated in an environment in which contaminants are passing through the valve. In such a case the removal of the valve stem is further complicated by the fact that the valve body is contaminated and must be carefully handled to prevent harm to the environment and to workers who have to modify the valve stem. Consequently, the Crass approach cannot easily be used in retrofitting existing valves with the components used to implement the illustrated Crass approach.

As another prior art approach, strain gauges have been mounted to valve stems and/or yokes of valves with the outputs of the strain gauges being read. The strain gauge outputs ar then used to calculate the thrust on the valve stem. This approach provides some indication of both dynamic and static valve performance characteristics. However, it has proven inaccurate. That is, to calculate the thrust on the valve stem, the Young's modulus for the stem material is required in the calculations. The Young's modulus varies with the exact material that is used for the stem and also with the characteristics of the batch of metal used in any specific valve. Consequently, computations of thrust are simply not dependable enough to provide an accurate indication of the actual thrust being applied to a valve stem.

Therefore, a need exists for a method of accurately determining the thrust on a valve stem during both static and dynamic conditions without requiring disassembly of a valve nor the use of error-prone mathematical computations to calculate the theoretical thrust on a valve stem.

SUMMARY OF THE INVENTION

In accordance with the present invention, a strain gauge is mounted to a force reactive portion of a valve, such as the valve stem or yoke of the valve, and the strain gauge is calibrated to provide an output which corresponds to the actual thrust applied to the drive stem by a valve actuator. Calibration is accomplished in situ, that is without requiring the removal of the valve stem from the valve.

More specifically, the valve stem is decoupled from the valve actuator so as to be capable of movement through at least a small distance without interference by the valve stem drive elements. Decoupling is accomplished by, for example, loosening or removing a drive nut or other element which transfers the driving force from the actuator to the valve stem. This permits the valve stem to move toward and away from a closed position in which a valve body or disc attached to the valve stem is seated in a valve seat of the valve. With the valve stem floating in this manner, at least one and preferably plural known loads are applied by a load application device to the valve stem. The output of the strain gauge in response to the known load or loads is then measured. Typically, the known load is varied over time with the measured strain gauge output being recorded and correlated to the applied loads. The load application device is thereafter removed and the valve stem is again drivenly coupled to the valve actuator. The output from the strain gauge during operation of the valve is then used to provide a measurement of the actual thrust applied to the valve stem inasmuch as the strain gauge output has now been calibrated to correspond to known loads.

In a specific implementation of the method, the free end of the valve stem spaced from the valve body or disc is exposed. In addition, the valve stem is decoupled from the valve stem driving mechanism. For example, decoupling may be accomplished by loosening or removing a drive nut (or lock nut therefore) to permit the drive stem to move through at least a short distance (e.g. one-eighth inch) without engaging the drive force applying components of the valve. Also, a load cell is placed against the exposed free end. A force applying device, such as a hydraulic ram, is operated to apply a variable force to the load cell to in turn load the decoupled valve stem, in this case with a variable axial load. Because the valve stem is decoupled from the drive mechanism, it is free to move and change dimensions in response to the applied load without restriction by the drive mechanism. At least one strain gauge is mounted to a force reactive portion of the valve, such as the valve stem, for measuring the dimensional changes of the valve in response to the applied load. Because the load is known, the strain gauge output is correlated or calibrated to the known load and thus to the measured thrust on the valve stem. The load is preferably traceable to a national standard due to the measurements of the load cell obtained during the calibration procedure.

In this specific example, the force applying device is held in place by a fixed rigid structure. Conveniently, this structure may comprise a plate mounted to a pair of threaded rods which are in turn coupled to the valve actuator housing. Typically, to expose the free end of the valve stem, a housing or enclosure surrounding the valve stem is removed from the valve actuator housing. The valve stem enclosure is typically bolted to the valve actuator housing such that the removal of these bolts leaves threaded apertures for receiving the plate supporting rods. In this case, because the force applied to the load cell is also reactively applied via the actuator housing to the yoke as well as to other components of the valve, the strain gauge may be mounted to a leg of the yoke. In addition, plural strain gauges may be used and their outputs combined, for example by averaging, if desired. For example, one strain gauge may be positioned on each leg of the yoke. In this case, changes in the dimension of the yoke as a result of the load applied to the valve stem are used in calibrating the thrust applied to the valve stem. Similarly, other portions of the valve assembly which react to the calibration load may receive strain gauges for purposes of calibrating the thrust applied to the valve stem in response to the known test load.

After the calibration is complete, the valve stem is recoupled to the actuator for movement in response to a force applied by the valve actuator. The strain gauge output is then monitored during operation of the valve, for example on a periodic, selective, or continuous basis. The dynamic performance characteristics of the valve, which are affected by drag induced by valve packing, the geometry of the valve stem, including whether the stem is bent, the condition of the valve stem guide and the valve disc, add the like may be monitored during shifting of the valve body toward and/or away from a seated position. The monitored strain gauge output may be compared with a reference to provide an indication of insufficient drag, excessive drag, or both during dynamic operation of the valve. The reference may comprise the initial dynamic response of the valve to known loads. In this case, if the valve deviates from this initial drag characteristic by more than a predetermined amount, defects in the valve, packing, or other valve components is indicated. Alternatively, a common reference for all valves of given type may be established from measured characteristics of valves known to be operating in a proper manner. Again, deviations from the standard reference of more than a predetermined amount or threshold indicate a defective component in the valve.

Simultaneously or alternatively, the strain gauge output may be monitored and compared with a reference when the valve is in a seated position to provide the valve stem thrust when the valve is seated. Also, the valve set points may be adjusted to alter the valve actuating force to increase or decrease the thrust on the valve stem when the stem is seated so that the actual thrust as measured by the strain gauge matches the desired or reference thrust.

It is accordingly one object of the present invention to provide an improved method for direct measurement of valve stem thrust.

A still further object of the invention is to provide a highly accurate method for determining the valve stem thrust of an operating valve.

It is another object of the present invention to provide such a method which can be implemented in situ without requiring the disassembly and removal of a valve stem from the valve.

Yet another object of the present invention is to provide such a method which is easily implemented for use with valves which have been previously operated, including in environments which have contaminated the valve stem or valve disc.

These and other objects, features and advantages of the present invention will become more apparent with reference to the following description and drawings.

BRIEF DESCRIPTION OF THE DRAWINGS

FIG. 5 is a flow chart illustrating the method steps of the present invention.

DETAILED DESCRIPTION OF THE PREFERRED EMBODIMENTS

Figures 1, 2:
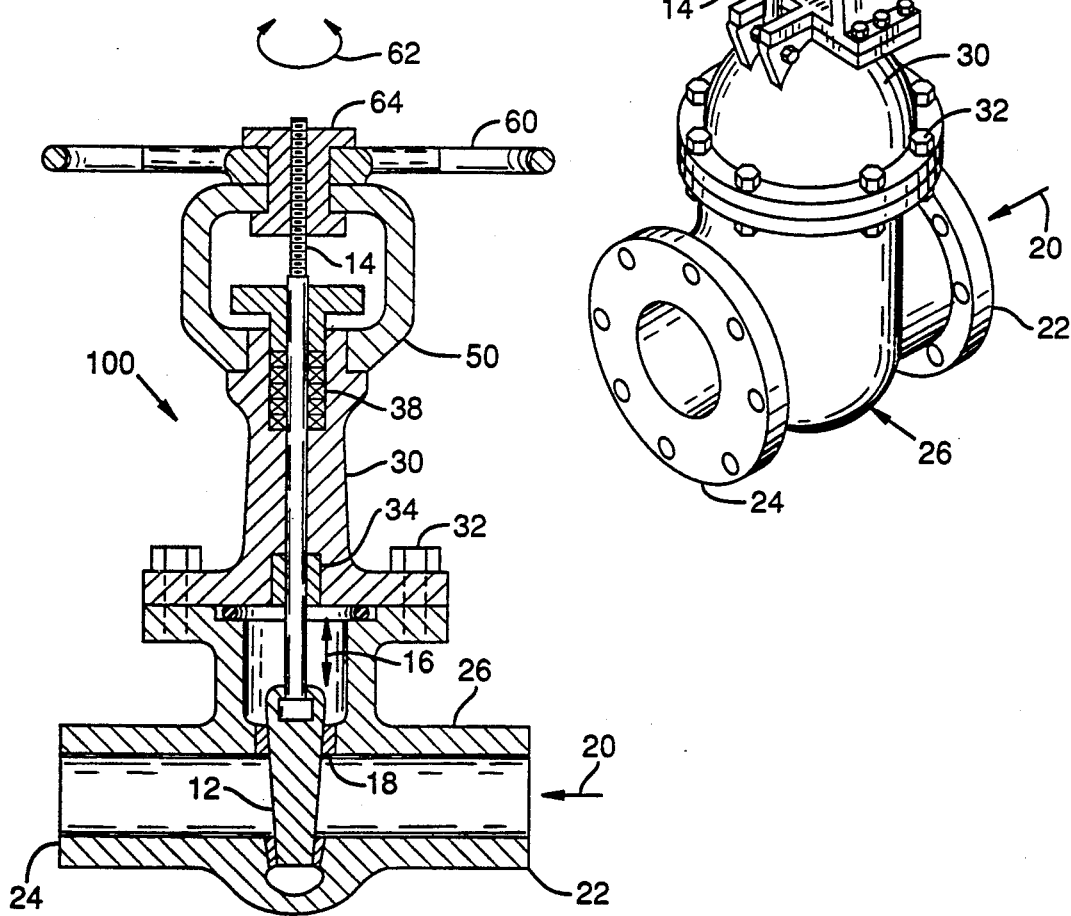
FIG. 1 is a perspective view of a conventional power driven valve of a type in which the present method may be readily used.
FIG. 2 is a cross-sectional view of a conventional manually actuated valve which may be operated in accordance with the method of the present invention, this figure being provided to indicate the versatility of the present invention.

With reference to FIGS. 1 and 2, two types of conventional valves 10 and 100 are illustrated. The valve 10 comprises an automatically actuated valve with a manual override, while the valve 100 comprises a manual valve. As a specific example, the valve 10 may comprise a Model 2155-2-WE-E valve from Pacific Valves, Inc. of Long Beach, Calif. For convenience, functionally corresponding elements of these valves are indicated with like numbers. Also, inasmuch as the FIG. 2 valve is shown in cross-section, a number of elements of this valve are visible whereas corresponding elements of the valve 10 are concealed by the valve housing. It should be noted that the invention is not limited to any specific type of valve. Therefore, the invention applies not only to manually operated valves, but also to power actuated valves, including pneumatic, hydraulic and motor driven valves. Therefore, the description of the valves in FIGS. 1 and 2 is for convenience and not to be taken as a limitation of the breadth of the invention.

Each of these valves 10, 100 has a valve body, such as a disc plug or gate 12 in FIG. 2, which is coupled to a valve stem 14. Shifting of the valve stem 14 in axial directions, such as indicated by arrow 16, moves the valve body 12 from a closed position as shown in FIG. 2 to open positions. When the gate or valve body 12 is in a closed position, the gate is seated within valve seats 18 to block the flow of fluid, as indicated by arrow 20, between an inlet 22 and an outlet 24 of the valve housing 26.

A valve bonnet 30 is mounted to the valve body 26, as by bolts 32. The FIG. 2 form of valve bonnet includes a stem guide 34 for guiding the axial shifting movement of the valve 10 in the direction of arrow 16. Valve packing 38 is positioned within the valve bonnet to seal the valve stem and prevent the egress of fluid past the valve stem when the valve is operated. A yoke 50 is mounted to the bonnet. The yoke supports a valve actuator 57 which is coupled to the valve stem for shifting the valve disc between the open and closed positions.

In the FIG. 1 form of valve, the valve actuator mechanism 57 includes a manual actuator 54 coupled to the valve stem so that the valve can be operated by hand by rotating the manual actuator. In addition, the illustrated actuator mechanism 57 includes a motorized actuator which includes a motor 56 which is responsive to a signal supplied, for example, from a remote control room, to operate the valve. The automatic or motorized actuator includes a torque limiter or torque switch 58 and a transmission assembly (not shown) for coupling the motor to the valve stem. In a typical case, the transmission assembly includes a valve drive nut, a worm gear, and a worm. The torque switch 58 may track a Belleville spring which is in contact with one end of the worm. Gearing monitors the compression of the Belleville spring by the worm and translates the movement into movement of the torque switch assembly 58. The torque switch assembly may comprise a rotary or sliding switch which is configured to disconnect the power source to the motor 56 whenever a designated compression of the Belleville spring is attained. Details of this type of transmission system, as well as other types of systems, are in the prior art, such as in the aforesaid patent to Crass. In these types of systems, the transmission assembly may be readily decoupled from the valve stem, such as by loosening and/or removing a stem nut or a lock nut which holds the stem nut in place. In this case, the valve stem 14 is able to shift axially independently of the transmission to shift the valve body or disc toward and away from the closed position. Although more movement is permitted, typically, only a small amount of floating movement of the valve stem (e.g. about one-eighth of an inch) is required during the calibration procedure.

In the FIG. 2 valve, the actuator mechanism comprises a hand wheel 60 which is rotated in the directions indicated by arrow 62 about the axis of valve stem 14 to shift the valve body or disc 12 between open and closed positions. A yoke nut 64 couples the manual actuator 60 to the valve stem. By removing the yoke nut 64, the valve stem is free to move in an axial direction independently of the actuator 60.

As described in detail in the patent to Crass, numerous factors modify the valve stem thrust actually supplied to the valve disc or body 12. For example, in the FIG. 1 type of valve, the compression curve of the Belleville spring often changes with age, therefore permitting a greater travel of the worm for a given amount of thrust. Additionally, drive loss is incurred in the coupling between the worm gear and the valve drive sleeve. Also, nonlinearities exist in the compression curve of the Belleville spring. As a result, adjustment of the torque switch deactivation point by adjustment of the torque switch position can lead to inaccuracies in the actual thrust applied by the valve stem. Also, changes in the valve packing, lubricant around the Belleville spring and defects in the valve, such as a bent valve stem, can vary the amount of thrust applied to the valve disc during seating or applied to the valve stem during movement of the stem for a given torque applied to the actuator.

Consequently, a method of enhancing the direct measurement of the thrust being applied to a valve stem during operation of the valve, under both dynamic and static conditions, is highly desirable.

Figure 3:
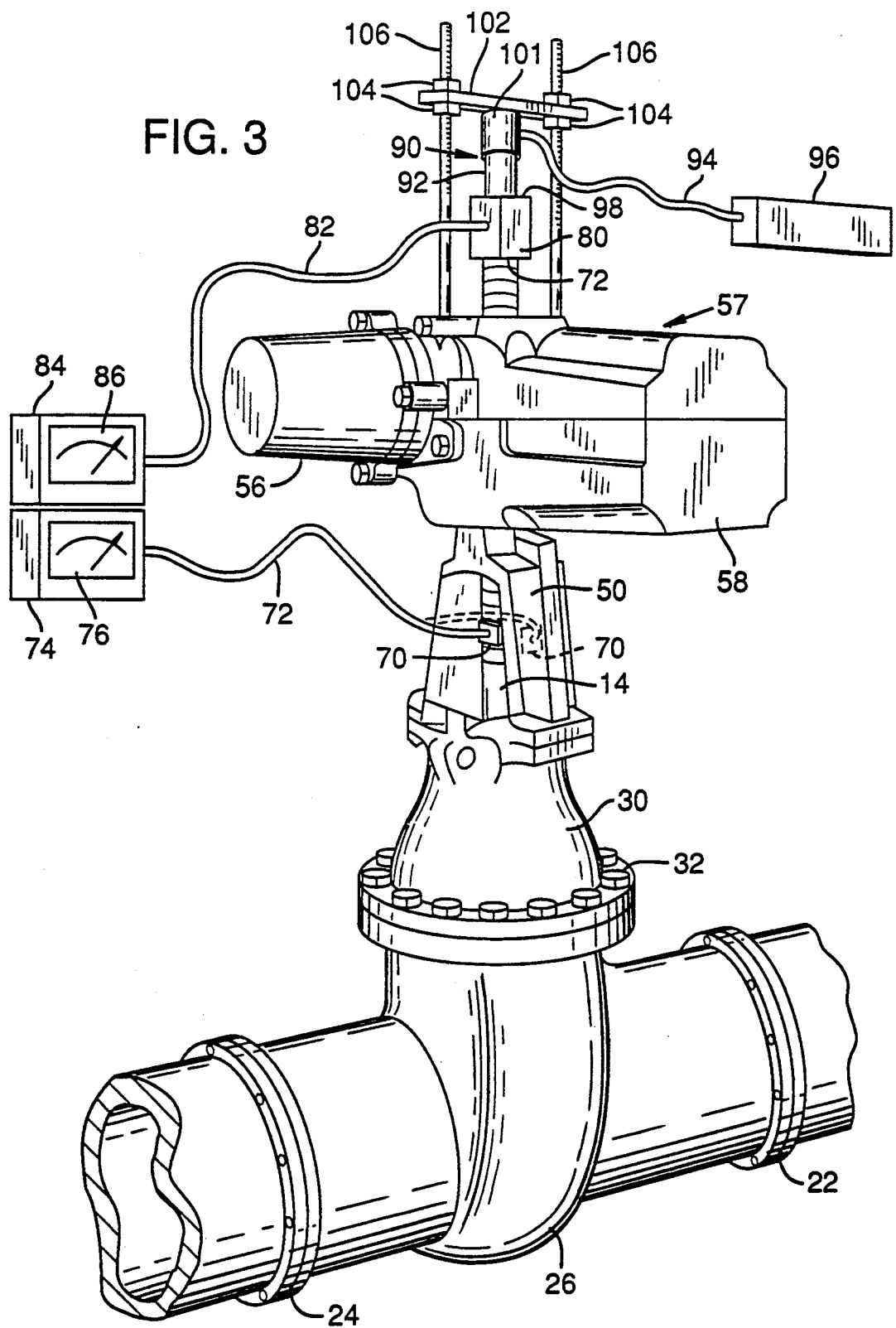
FIG. 3 is a perspective view of a valve of the type shown in FIG. 1 and illustrating one approach for calibrating the valve in accordance with the present invention.

With reference to FIG. 3, the method of the present invention involves mounting at least one strain gauge 70 to a force reactive portion of the valve. By force reactive portion, it is meant the portion of the valve which reacts to an applied test load by changing dimensions, for example in cross-section or axially, in response to the applied load. In FIG. 3, the strain gauge 70 is securely mounted, as by epoxy, to a portion of the valve stem 14 located between the legs of yoke 50. This portion of the valve stem is easily accessible because it is exposed at all times during the operation of the valve between open and closed positions.

The strain gauge 70 is coupled by a cable to a data acquisition and indicator device 74. Typically, the data acquisition and indicator 74 provides a visual indication, as by meter 76, of the output of the strain gauge. In one specific form of data acquisition device, a voltage is applied to the strain gauge configured as a full wheatstone bridge strain gauge with the voltage output of the strain gauge providing the input to a data acquisition device. The data acquisition device preferably provides an output in a form suitable for use by a remotely located computer or an operator in monitoring the performance of the valve. Although any suitable data acquisition device may be used, including analog devices, one suitable data acquisition device is a Totem-Testem ™ data acquisition system from Teledyne Engineering Services (Brewer Engineering Laboratories of Marion, Mass.). This particular device produces an output in the form of "counts".

Figure 6:
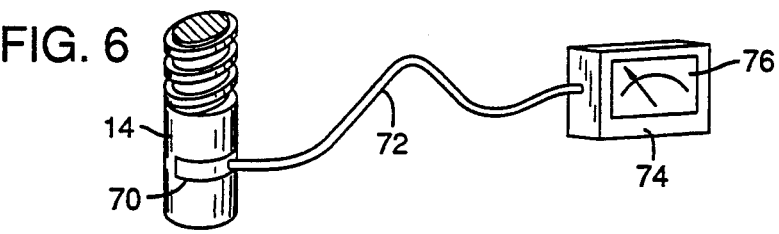
FIG. 6 is a perspective view of a portion of a valve stem with a particularly suitable form of strain gauge mounted to the valve stem.
Figure 7:
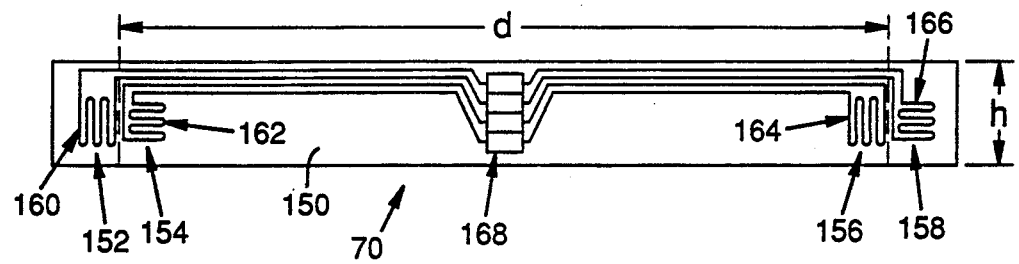
FIG. 7 is an enlarged front view of the strain gauge of FIG. 6.

FIGS. 6 and 7 illustrate a particularly advantageous strain gauge usable in the present invention. This form of gauge comprises a substrate 150, such as of cast polyimide or another suitable material. Four strain gauge elements 152–158 are supported on the substrate. These elements 152–158 may be of any suitable material with a temperature compensating alloy such as Constantan alloy as used in strain gauges by The Measurements Group, Inc., of Raleigh, N.C. These elements may be configured as a full bridge strain gauge. The strain gauge loops 160 and 162 of strain gauge elements 152, 154 are preferably oriented at right angles to one another with a similar orientation being provided for the loops 164 and 166 of strain gauge elements 156, 158. When mounted to a valve stem 70, the distance measured from a line between the elements 152 and 154 and a line between the elements 156 and 158 is preferably equal to one-half of the circumference of the valve stem. Therefore, when the strain gauge 70 is mounted to the valve stem as shown in FIG. 6, the elements 152, 156 and 154, 158 are one hundred and eighty degrees apart about the perimeter of the valve stem. Consequently, dimensional changes in the valve stem in both longitudinal and cross-sectional dimensions are accurately measured. The typical height of the strain gauge 70 is only about one-fourth of an inch. By making the substrate 150 of a thin material, such as about 0.01 inch thick sheet material, the strain gauge easily bends to fit the contour of the valve stem (or other surface to which it is mounted). Also, the strain gauge may remain in place during removal of the valve stem, such as for maintenance, because the strain gauge 70 is thin enough to pass through the valve stem packing follower. The strain gauge 70 also conveniently includes contact locations 168 to which electrical wires may be attached, as by soldering, to couple the strain gauge to the data acquisition device. The illustrated strain gauge comprises a full bridge which is balanced to between ±1% and provides 350 Ω resistance ±0.4% at 24° C.

With this construction, the strain gauge output is balanced even if the longitudinal axis of the substrate is skewed with respect to horizontal when the substrate is mounted to the valve stem. Therefore, this specific strain gauge 70 is easy to install for use in the method.

Again, in accordance with the method of the present invention, the drive stem 14 is decoupled from the actuator so that the valve stem is free to move axially at least a limited distance without interference by the actuator. For example, the drive nut (not shown) may be loosened or removed without disassembling the valve stem such that the method may be easily implemented in situ in both new and existing valves.

In addition, in FIG. 3, the portion of the valve housing or enclosure which surrounds the upper or free end portion 72 of the valve stem 14 may be removed to expose the valve stem end portion 72. A commercially available load cell 80 or other load measuring device is placed on the end 72 of the valve stem and is coupled by a cable to a data acquisition device 84 which also may have an indicator, such as meter 86, for providing a visual indication of the load detected by the load cell. The data acquisition device 84 is conventional and typically provides an output which is equal to the pounds of force detected by the load cell 80.

In FIG. 3, the force applying mechanism, indicated generally at 90, applies a force through the load cell 80 and to the valve stem 14. In the illustrated embodiment, the force is applied axially to the valve stem and is coupled through the load cell 80 to the upper end 72 of the valve stem. Although the force applying device may take many forms, the illustrated form comprises a hydraulic cylinder 92 which is responsive to hydraulic fluid pressure in a fluid line 94 from a source 96 to provide a variable axial load to the valve stem.

The applied load, due to the measurements of load cell 80, is known and therefore matches a National Bureau of Standards traceable load. In FIG. 3, the lower end 98 of the load supplying device 90 bears against the load cell 80 while the upper end 101 of the load applying device is braced against a rigid backing structure. This backing structure may, for example, be fixed against rigid framework or other structures in the environment in which the valve is used. In this case, the valve stem 12 comprises the force reactive portion of the valve to which the strain gauge 70 is mounted.

However, in FIG. 3, the reinforcing or backing structure comprises a rigid plate 102, such as steel, mounted to the valve assembly such that other portions of the valve assembly, including the yoke, also react to the applied load. More specifically, the plate 102 is secured by nuts 104 to threaded rods 106 which in turn are connected to the housing of the actuator mechanism 57. Typically, the valve stem enclosure which is removed to expose the valve stem end portion 72 is mounted by bolts to the housing of the actuator mechanism 57. Consequently, removal of the valve stem enclosure leaves threaded openings for threadedly receiving the lower ends of the rods 106. When braced in this manner, the force applied to the valve stem by load mechanism 90 is also reactively applied by plate 102, rods 106 and the actuator housing to the yoke 50 of the valve, as well as to other components of the valve assembly. Consequently, the strain gauge 70 may be mounted to any of these other reactive components, such as to the yoke 50 (as shown in dashed lines in FIG. 3). In addition, plural strain gauges may be used, for example, one being mounted to each leg of the yoke or to other reactive components of the valve with the outputs of these strain gauges being combined, as by averaging, during the thrust calibration procedure.

Of course, the force applying mechanism 90 may be coupled to the valve assembly or other rigid structures in any convenient manner to rigidly reinforce or back the force applying mechanism.

Figure 4A:
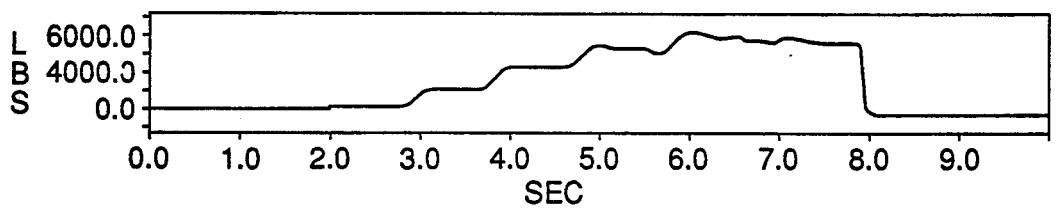
FIGS. 4a, 4b, and 4c are charts illustrating the results of the calibration approach illustrated in FIG. 3.
Figure 4B:
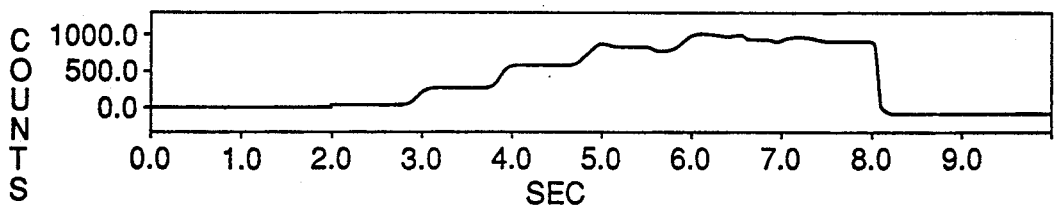

FIG. 4a is a chart of the output obtained from the load cell data acquisition device 84 in response to the varying load applied over time by the load application device 90 of FIG. 3. In this case, the load was being applied to the valve stem 14 of a Model 2155-2-WE-E valve as previously mentioned. FIG. 4b is a chart showing the output of the data acquisition device 76, in this case of a Totum-Testem ™ data acquisition system in "counts", the units provided by this specific system. By performing a linear regression analysis of the graphs of FIGS. 4a and 4b, a plot of pounds versus counts is obtained. The slope of this curve for this specific valve under test, shown in FIG. 4c, rounded to the nearest hundredth, is 8.61. More specifically, the resulting equation ($Y = MX + B$, where M is the slope and B is the zero crossing) from the linear regression analysis for this specific valve under test is:

$$Y = (8.613286)X + (-38.410966)$$

Figure 4C:
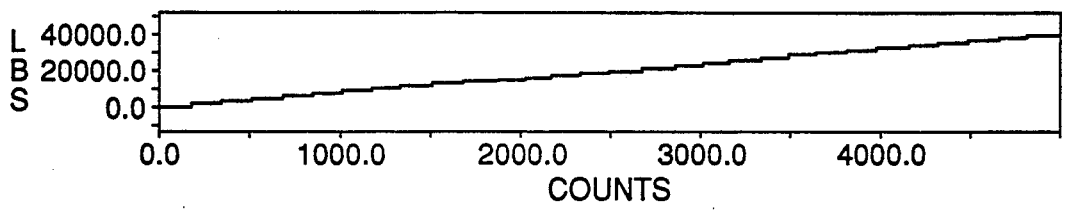

Following removal of the load applying mechanism 90 and recoupling of the valve stem to the valve actuator, and during operation of the valve, both under dynamic and static conditions, the actual pounds of valve stem thrust is determined from the measured strain gauge output in counts by multiplying the number of counts by the slope (8.613286) of the FIG. 4c curve. Of course, the data may be obtained in analog form and/or processed in other manners in order to accurately correlate the strain gauge output to the known test load.

As a result, an extremely accurate and reliable direct measurement of thrust is obtained during both static and dynamic operating conditions. The accuracy of valve stem thrust measurements during testing to date has only been limited by the accuracy of the load measuring device used during calibration of the system in accordance with the present invention. For example, for a known load of a traceability of 0.25% to National Institute of Standards and Technology Standards, the valve stem thrust measurements obtained utilizing the method of the present invention have been observed to be within about 1% of the actual valve stem thrust. The accuracy would be expected to increase with a more accurate standard load. Moreover, even if the accuracy was much lower, the results are more reliable and predictable than known prior art approaches.

For purposes of comparison, the method of the present invention was applied to seven purportedly identical Model 2155-2-WE-E gate valves from Pacific Valves, Inc. The measured slope varied from 8.61 to 9.03 for these valves. For comparison purposes, the conventional analytical equation for converting strain gauge counts to valve thrust was used to compute the slope. This formula uses Young's modulus for stainless steel, the material from which the valve stems were made. The computed value of the slope was 8.14. Not only is this value significantly different from the actual measured value, the assumption in the analytical approach is that the value of the slope is the same for all of the valves even though this was not the case. Although in some cases and for some valves the analytical equation has resulted in computed thrust values within one or two percent of the actual measured values, other cases as indicated by the above example, show a much greater deviation. Therefore, the analytical method of computing thrust from strain gauge measurements utilizing Young's modulus for the material of the valve stem is not sufficiently dependable for many applications.

As a further explanation of the method of the present invention, reference is made to the flow chart of FIG. 5 which starts at a block 120. From block 120, a block 122 is reached which recites the step of mounting the strain gauge to a force reactive portion of the valve, such as the valve stem, or the valve yoke if a load applying system such as shown in FIG. 3 is used. From block 122, a block 124 is reached, which indicates the step of decoupling the valve stem from the valve actuator, such as by loosening or removing a drive nut or other transmission component. The steps of blocks 122 and 124 may equivalently be interchanged. At block 126, the thrust calibration step is completed. Again, this involves the application of a known load or loads to the valve stem and a determination of the strain gauge output in response to the known loads. At block 128, the valve stem is recoupled to the valve actuator, the load cell being removed, and the valve is in condition for full operation.

Periodically, continuously, or selectively during the operation of the valve, the strain gauge output is monitored as indicated by the block 130. This may be done by visual inspection of a display of the output by a worker or remotely by a computer coupled to a strain gauge output device, or both. The dynamic and/or static characteristics of valve performance may be monitored in accordance with the present method.

In monitoring the dynamic characteristics (block 132), as the valve stem is shifted by the valve actuator toward and/or away from its seated position, the strain gauge output may be monitored and compared with a reference. This reference may correspond to a window comprising a minimum and maximum valve stem thrust during these dynamic conditions. If, for example, the thrust is less than the minimum specified thrust, an indication is provided, for example, that the packing is excessively loose and not exerting enough drag on the valve stem. Conversely, a thrust in excess of the maximum thrust provides an indication of other defects, such as that the valve has become bent during operation of the valve. Other characteristics of valve performance may also be monitored. For example, the current or other power source supplied to a drive motor or other actuator may be monitored and compared with the thrust to determine the actuator efficiency. If the actuator becomes inefficient, maintenance or replacement is indicated. From block 132, a block 134 is reached, corresponding to the step of indicating performance deviations due to insufficient or excessive drag. For example, one form of indication comprises a visual alarm which would prompt a worker to verify whether the valve should be removed from service due to defects in its performance. From block 134 the dynamic monitoring of the valve ends at block 136.

Similarly, the static characteristics of valve performance may be monitored, as indicated at block 138. At this block, the strain gauge output is compared with a reference for a seated valve. This reference may be established for an individual valve based on its initial thrust characteristics, or may be standard for all valves of a given type within a plant. Also, like the case of dynamic testing, the reference may comprise a maximum, a minimum, or a window between a minimum and maximum threshold. The thrust on the valve stem when the valve body or disc is seated is required to be in excess of the minimum, below the maximum, or within the window, depending on what type of reference is being utilized. Of course, other references may be used for both static and dynamic valve stem thrust evaluations.

From block 138, either or both of blocks 140 and 142 are reached. At block 142, adjustments are made to the valve actuating force, as by adjusting set points on a torque limiter, to bring the static thrust into correspondence with the reference. At block 140, a visual or other indication is provided of the thrust under the static valve seated conditions. This indication may take the form of an alarm in the event the thrust deviates from the established reference. From blocks 140 and 142, a block 144 is reached and the static testing process ends.

Having illustrated and described the principles of my invention with reference to several preferred embodiments, it should be apparent to those of ordinary skill in the art that my invention may be modified in arrangement and detail without departing from such principles.

I claim as my invention all such modifications as fall within the spirit and scope of the following claims.

I claim:

1. A method of determining the thrust exerted on the force reactive portions of a valve during movement of a valve body, the valve body being movable to and from a closed position in which the valve body is seated in an associated valve seat and closes a flow path between an inlet and an outlet to the valve, the valve body being coupled to a valve stem and moved to and from the closed position in response to a valve actuator which applied an axial valve actuating force to a portion of the valve stem which is spaced from the valve body, the method comprising the steps of:

positioning a strain gauge on a force reactive portion of the valve, the strain gauge providing an output corresponding to dimensional variations of the force reactive portion of the valve at the location of the strain gauge in response to application of the valve actuating force to the valve stem;

decoupling the valve stem from the valve actuator;

calibrating the strain gauge by applying at least one known test load to the decoupled valve stem without removing the valve stem from the valve and monitoring the output from the strain gauge in response to the known test load;

removing the test load;

recoupling the valve steam to the valve actuator;

monitoring the output from the strain gauge in response to the application of a valve actuating force by the valve actuator.

2. A method according to claim 1 including the step of comparing the output from the strain gauge with a reference.

3. A method according to claim 2 including the step of detecting and indicating differences between the strain gauge output and the reference.

4. A method according to claim 2 including the step of adjusting the force applied by the valve actuator in response to the comparison.

5. A method according to claim 1 including the step of adjusting the force applied by the valve actuator 6. A method according to claim 1 including the step of comparing the strain output with a reference to determine drag on the valve stem during operation of the valve toward a seated position.

7. A method according to claim 6 also including the step of comparing the strain gauge output with a reference to determine drag on the valve stem during operation of the valve away from the seated position.

8. A method according to claim 1 including the step of comparing the strain gauge output with a reference to determine thrust exerted on the valve stem when the valve body is seated in the valve seat.

9. A method according to claim 8 including the step of adjusting the force applied by the valve actuator in response to the comparison.

10. A method according to claim 1 in which the positioning step comprises the step of positioning the strain gauge on a portion of the valve stem.

11. A method according to claim 1 in which the positioning step comprises the step of positioning the strain gauge on a yoke which couples the valve actuator to the valve stem.

12. A method according to claim 1 including the step of comparing the strain gauge output with a reference to determine drag on the valve stem during operation of the valve away from a seated position.

* * * * *

UNITED STATES PATENT AND TRADEMARK OFFICE
CERTIFICATE OF CORRECTION

PATENT NO. : 5,220,843
DATED : June 22, 1993
INVENTOR(S) : Thomas A. Rak

It is certified that error appears in the above-indentified patent and that said Letters Patent is hereby corrected as shown below:

Column 4, line 28, "ar" should read --are--.

Column 13, line 12, "applied" should read --applies--.

Column 14, line 8, "[blank space]" should read --in response to the nonitored strain gauge output.--.

Signed and Sealed this

Ninth Day of May, 1995

Attest:

BRUCE LEHMAN

Attesting Officer

Commissioner of Patents and Trademarks